United States Patent
Stabile

(10) Patent No.: US 8,253,080 B2
(45) Date of Patent: Aug. 28, 2012

(54) HEATING APPARATUS

(75) Inventor: Aldo Stabile, Crema (IT)

(73) Assignee: CADIF S. R. L., San Giovanni Lupatoto (IT)

( * ) Notice: Subject to any disclaimer, the term of this patent is extended or adjusted under 35 U.S.C. 154(b) by 531 days.

(21) Appl. No.: 12/531,866

(22) PCT Filed: Mar. 14, 2008

(86) PCT No.: PCT/IB2008/000593
§ 371 (c)(1),
(2), (4) Date: Sep. 17, 2009

(87) PCT Pub. No.: WO2008/117146
PCT Pub. Date: Oct. 2, 2008

(65) Prior Publication Data
US 2010/0038354 A1 Feb. 18, 2010

(30) Foreign Application Priority Data
Mar. 27, 2007 (IT) .............................. MO2007A0105

(51) Int. Cl.
*H05B 3/34* (2006.01)
*H05B 3/32* (2006.01)
(52) U.S. Cl. ........ 219/549; 219/528; 219/546; 219/544; 219/213; 219/217
(58) Field of Classification Search .................. 219/549, 219/528, 546, 544, 213, 217
See application file for complete search history.

(56) References Cited

U.S. PATENT DOCUMENTS

| | | | |
|---|---|---|---|
| 4,814,586 A * | 3/1989 | Grise | 219/549 |
| 7,196,288 B2 * | 3/2007 | Weiss et al. | 219/217 |
| 7,202,444 B2 * | 4/2007 | Bulgajewski | 219/217 |
| 2004/0069762 A1 * | 4/2004 | Yoneyama et al. | 219/217 |
| 2004/0238516 A1 * | 12/2004 | Bulgajewski | 219/217 |
| 2007/0272673 A1 * | 11/2007 | Keane | 219/212 |
| 2009/0114633 A1 * | 5/2009 | Naylor et al. | 219/213 |
| 2009/0200285 A1 * | 8/2009 | Raidt et al. | 219/213 |
| 2010/0219664 A1 * | 9/2010 | Howick et al. | 297/180.12 |

FOREIGN PATENT DOCUMENTS

| | | |
|---|---|---|
| FR | 2 365 268 A | 4/1978 |
| FR | 2 849 342 A | 6/2004 |
| WO | WO-01/93639 A | 12/2001 |
| WO | WO-03/007659 A | 1/2003 |
| WO | WO-2004/033970 A1 | 4/2004 |

* cited by examiner

*Primary Examiner* — Nitin Parekh
(74) *Attorney, Agent, or Firm* — Birch, Stewart, Kolasch & Birch, LLP

(57) ABSTRACT

The heating apparatus comprises a stratified and flattened body, said body comprising, from the centre outwards, two first layers of laminar electricity conducting elements coupled together by interposing one centre layer of first laminar insulating means; two second layers of second laminar insulating means covering said two first layers; at least one third layer of laminar means covering said second layers, said second layers comprising sheets of adhesive material that can be removed by pulling them from said first layers.

24 Claims, 3 Drawing Sheets

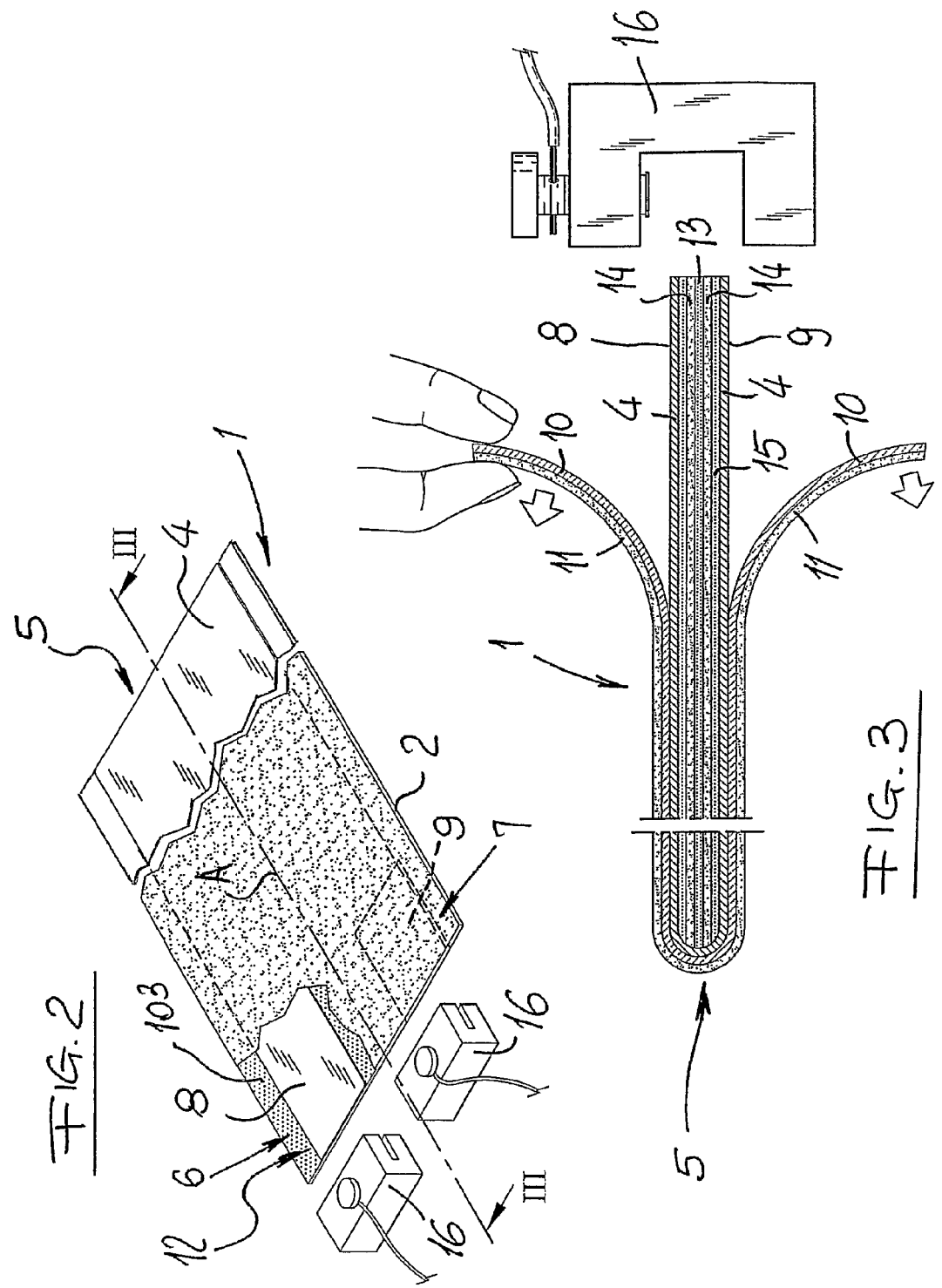

HEATING APPARATUS

TECHNICAL FIELD

The invention relates to a heating apparatus.

TECHNOLOGICAL BACKGROUND

Heating apparatuses are known for heating buildings as a substitution for the usual thermo-hydraulic heating systems that utilize wall mounted diffuser elements.

These heating apparatuses comprise very thin diffuser panels, which are normally powered by electricity and are installed under the surface of a wall or a floor; therefore, these apparatuses radiate heat in the rooms by heating them by means of heat conduction.

According to the patent PCT/IT02/00735 a band system is known for heating that comprises a band body which is substantially thin, formed by a pre-established number of layers of different materials coupled together and, more precisely, by a thin sheet of conductive metal material which is folded over on itself to form two parallel approachable laps that have a mutual end, where the fold is made, which is connected without interruption, and two opposite free ends.

In addition, between these two laps is placed a thin sheet of polyester that acts as electrical insulation and lastly two layers of bituminous material are applied externally, by dipping, that completely coat the two outer faces of the two laps.

At the free ends of the latter, two respective terminals are to be mounted that are for connecting, by means of electrical cables, to a low voltage electrical power supply device that can be placed in a special seat obtained in the walls of the rooms which are defined in the buildings and which has a switch for turning heating on or off and possibly also a regulator to allow the users to regulate the intensity of the electricity travelling through the two laps and, consequently, their heating temperature.

The band is flexible and positioned, e.g. under the concrete pavement that supports the coating material of a floor.

The band is put in place before the concrete pavement is laid, laying it normally according to the sides of the surface to cover and substantially over the whole surface available.

To make a substantially complete covering of the surface, since, although it is flexible, the band is unable to follow curves on a flat surface, the band is folded over on itself at the boundary areas, i.e. the perimeter walls, at 45° angles so that, with one or two folds made in succession, a path is created either in a coil, that comprises segments going away and other parallel segments returning, or segments in succession arranged in a spiral.

The widths and lengths of the sheets that form the layers are all the same, so a band is created that is substantially uniform at all points.

This state of the art has a drawback which is the need to obtain, after the band has been made, areas of free ends of the conductive metal material sheets that have no bituminous coating, so the terminals can be mounted on such uncoated areas and the conductive contacts can be made between the terminals and the sheets.

To eliminate the portions of bituminous sheets that cover these respective areas, a very low temperature gas is sprayed on them so that the bituminous material, getting really cold, becomes brittle and easily breakable and can be removed according to a precise design, uncovering the areas required.

This gas is very expensive and the whole procedure to remove the bituminous material which is firmly stuck on the areas of the faces of the sheets of conductive material takes a long time and is very difficult.

Another drawback is that if, when laying, the band is drilled accidentally or even intentionally to make some elements of the construction protruding in relief pass through a hole obtained in the band, the two laps of conductive metal material can be connected in short circuit with each other if the material of the construction element is also metal, acting as an electric bridge between the laps.

This short circuit leads to an increase in temperature of the sheets of conductive metal material concentrated in areas where the construction element goes through, in this specific case around the edges of the hole.

This increase in temperatures leads to the progressive burning of both sheets of conductive metal material which are very thin.

Burning extends progressively to a certain extent of the surface surrounding the hole and, due to the heat produced, tends to melt the sheet of polyester that acts as insulator.

This can determine the creation of areas without insulation among the sheets of conductive metal material and the consequent widening of the areas of direct contact between the two sheets of conductive metal material.

Such widening can extend up to the whole width of the band with the risk that, in those areas where the width of the band is reduced, the flow of electricity interrupts and, therefore, the working of the whole heating apparatus or part of it is also interrupted.

When this damage is done, to restore working of the heating apparatus, it is necessary to remove the surface that covers it, e.g. a floor, with serious damage and discomfort for the users who find themselves without heating and having to prepare the masonry for band repairs.

In addition, concentrated heating caused by a short circuit softens all the external bituminous covering layers, when nets are used—normally the case in masonry structures that cover the heating apparatus—and this softening happens, it causes these nets to be incorporated into the bituminous layers until they come into contact with the sheets of conductive metal material and, creating other short circuiting points which, if very close to one other can, in this case, interrupt the conduction of electricity and the production of heat.

Another drawback of the known technique is that due to the meltability of the bituminous covering layers, these known devices cannot be used to heat surfaces over which vehicles travel, such as roads and car parks, or airport runways, to keep them free from ice and snow.

The reason for this is that roads and runways are covered with layers of bituminous surfaces at the fluid or plastic state at very high temperatures, about 200° C., and these temperatures would melt the bituminous covering layers of the heating apparatuses, damaging them irreparably.

Another drawback of the known technique is that the band weighs a lot and this creates difficulties in handling, transporting and laying it.

OBJECTS OF THE INVENTION

One object of the invention is to improve the state of the art.

Another object of the invention is to make a heating apparatus that permits to uncover, as required, areas of the sheets of conductive metal material to apply electrical connecting terminals, thus avoiding the use of cooling gases.

Another object of the invention is to make a heating apparatus that permits to limit the areas where short circuits are created also in cases where holes are made on purpose or accidentally.

According object of the invention is to make a heating apparatus that does not weigh a lot, making handling, transporting and laying easier.

According to one aspect of the invention, a heating apparatus is provided comprising a stratified and flattened body, said body comprising, from the centre outwards: two first layers of laminar electricity conducting elements coupled together by interposing one centre layer of first laminar insulating means; two second layers of second laminar insulating means covering said two first layers; at least one third layer of laminar means covering said second layers, characterised by the fact that said second layers comprise sheets of adhesive material that can be removed by pulling them from said first layers.

According to another aspect of the invention a heating apparatus is provided comprising a stratified and flattened body, said body comprising, from the centre outwards: two first layers of laminar electricity conducting elements coupled together by interposing one centre layer of first laminar insulating means; two second layers of second laminar insulating means covering said two first layers; at least one third layer of laminar means covering said second layers, characterised by the fact said centre layer comprises a laminar supporting core in insulating material; coating and insulating means of said laminar supporting core to insulate said centre layer from said first layers.

The heating apparatus does, therefore, allow areas to be uncovered of said first layers of laminar electricity conducting elements without having to use cooling substances, simply by removing portions of sheets of adhesive material having preestablished dimensions.

BRIEF DESCRIPTION OF THE DRAWINGS

Further characteristics and advantages of the invention will appear more evident from the detailed description of a heating apparatus, illustrated indicatively by way of non limiting example, in the attached drawings wherein:

FIG. 2 is an interrupted schematic view on a reduced scale and in perspective of a portion of the heating apparatus of FIG. 1;

FIG. 3 is a longitudinal section view of the heating apparatus, taken according to a III-III plane of FIG. 2;

EMBODIMENTS OF THE INVENTION

With reference to FIG. 2 it can be noticed that the heating apparatus 1 comprises a band shaped body 2.

This band 2 is composed of layers of materials joined together and overlapping, according to a symmetrical layout with respect to the centre of the band 2 and continuing outwards.

Figure 1:
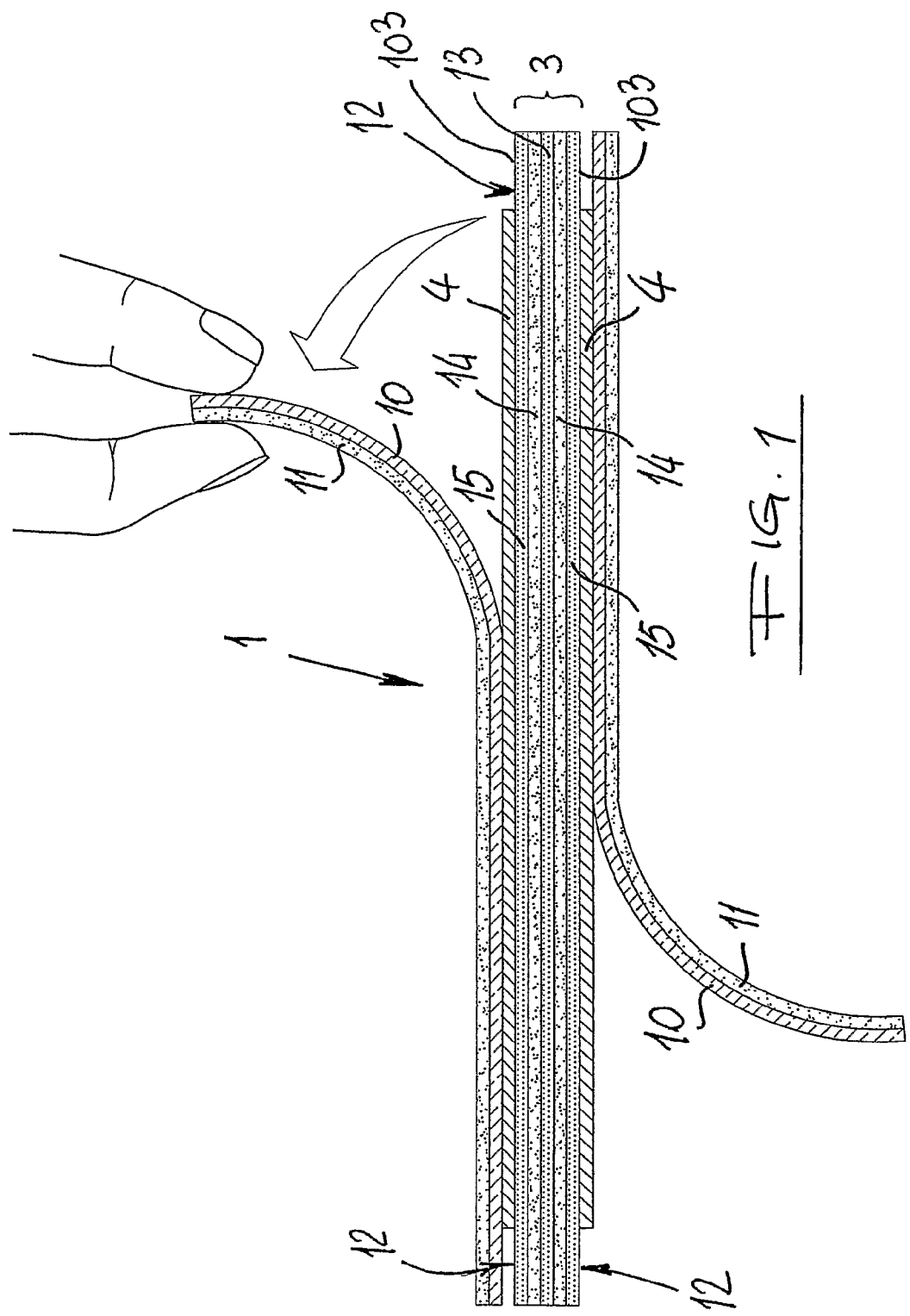
FIG. 1 is a cross section view of a heating apparatus.
Figure 4:
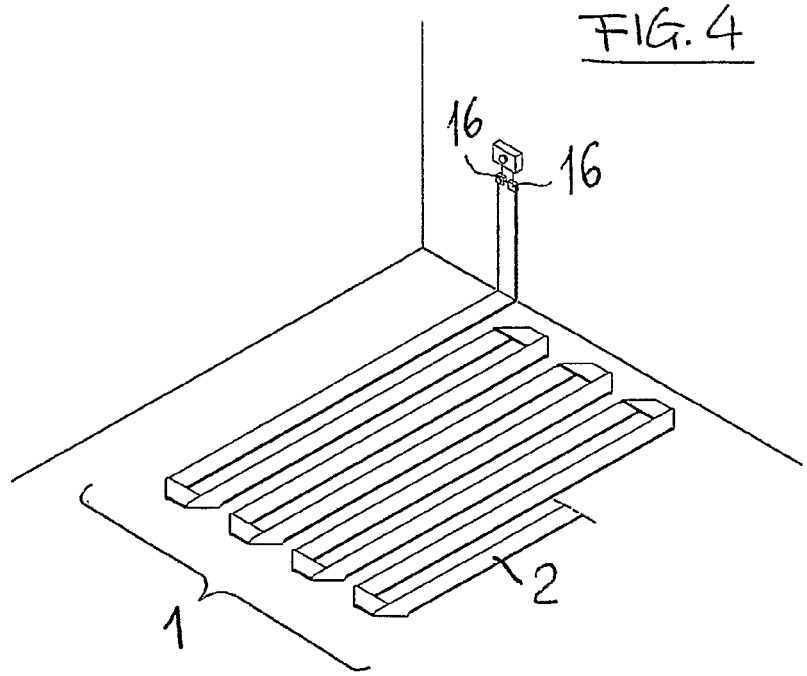
FIG. 4 is an interrupted perspective view of a possible laying diagram of the heating apparatus of FIG. 2.
Figure 5:
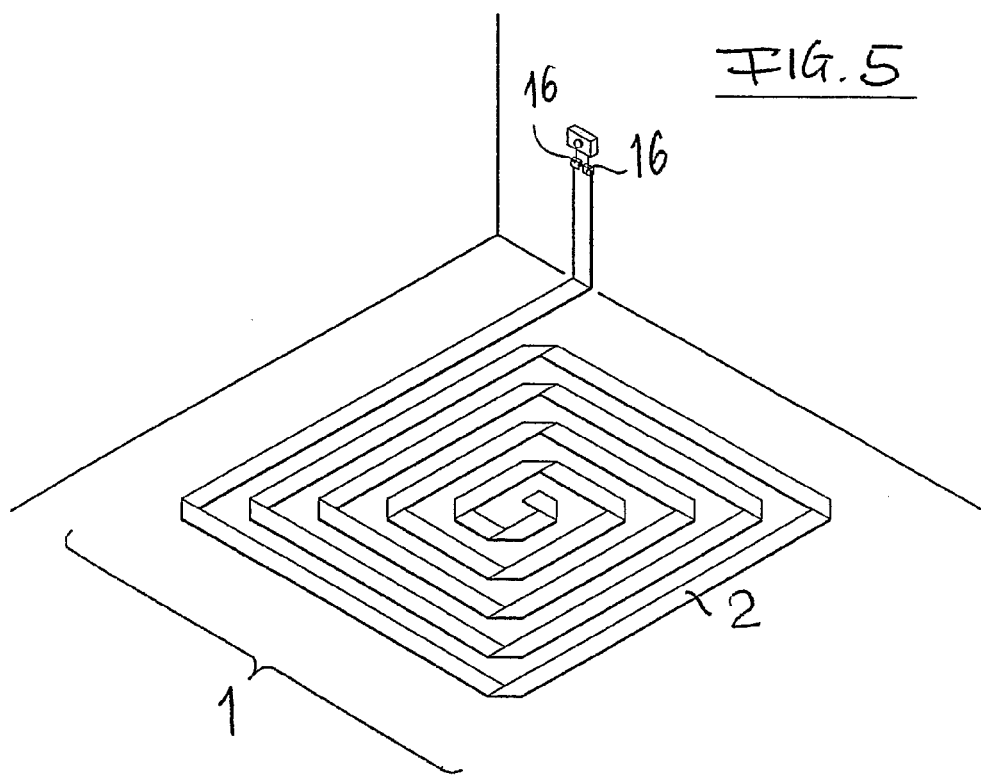
FIG. 5 is an interrupted perspective view of another possible laying diagram of the heating apparatus of FIG. 2.

With reference to FIG. 1 it can be noticed, in detail, that the latter comprises one centre layer 3, on the two outer faces 103 of which two first layers 4 of electricity conducting materials are applied in an adhering fashion, According to an embodiment of the heating apparatus 1, the two first layers 4 are obtained by folding one single continuous sheet of electricity conducting material to obtain two laps that define two first ends 5 coinciding with each other and two opposite second ends 6 and 7 which are, instead separate from one another.

The two first ends 5 can, however, also be separate from one another, i.e. for each lap and then joined together so as to obtain continuity between the two first layers 4.

These two second ends 6 and 7 can be shaped according to necessity and, as can be seen in FIG. 2, they have a substantially asymmetrical trend with respect to the longitudinal surface of the band 2 of track "A" which passes perpendicularly through the centre layer 3: in other words, one end is shaped in such a way to define a portion 8 that is positioned towards one side of the band 2 while the other end 9 is shaped in the opposite way, positioned towards the other side, and is located on the opposite side of the end 8 with respect to the centre layer 3.

On top of the first layers 4 two second layers 10 are applied in an adhering fashion which are made in the shape of sheets of adhesive material removable if pulled, as can be seen in FIG. 3.

By the definition of removable adhesive material, it is meant an adhesive material that can be removed and put back if required.

On top of the second layers 10 two additional third layers 11 are applied in an adhering fashion which are made in the shape of sheets of covering material, As can be seen in FIGS. 1 and 2, the first layers 4 are slightly narrower than overall width of the band 2 and bilaterally define two areas 12 that are without the first layers 4 of electricity conducting materials.

According to an embodiment of the heating apparatus, the centre layer 3 is again made of layers of material made of laminar sheets.

More precisely, the centre layer 3 comprises a core 13 on the faces of which two additional layers 14 of the so called nonwoven fabric are applied in an adhering fashion and on them two additional layers 15 of insulating material are applied in an adhering fashion.

On the portions 8 and 9 two terminals 16 are applicable for connection to an electricity source, arranged so as not to touch each other to avoid short circuits between the first layers 4.

In an embodiment of the heating apparatus 1, the core 13 is made up of a sheet of polymer material, e.g. polyester, and is about 30 micron thick.

The two additional layers 14 comprise respective sheets of nonwoven fabric that are from 50 to 100 micron thick.

The two additional layers 15 are again made in sheets of polymer material, e.g. polyester, and are about 23 micron thick.

The two first layers 4 comprise one sheet of aluminium that is folded at the end 5 and which forms two parallel sheets separated by the centre layer 3; this sheet of aluminium is about 12 micron thick.

The two second layers 10 are made in sheets of an adhesive polymer material, e.g. polyester, that can be removed by pulling from the first layers 4 on which they are applied in an adhering fashion and which can also be put back on if required.

These second layers 10 are about 50 micron thick.

The third layers 11 made in covering material, are also obtained as polyester sheets and are about 36 micron thick.

The heating apparatus 1 is laid on a surface, normally flat, but it can also e on steps or in recesses, being completely flexible.

To feed the first layers 4 with electrical energy an operator removes two parts of the second layers 10 and of the third layers 11 applied in an adhering fashion on them, so as to uncover the two portions 8 and 9 on which the terminals 16 are then mounted.

To remove the portions of second layers 10 all the operator has to do is pull on them which, as they are normally made in the shape of a polyester foil that has one adhesive face, come away from the first layers 4 thus uncovering them.

More precisely, the operator uncovers two portions 8 and 9 which are on opposite sides with respect to the core 13 and which are also simultaneously defined by opposite sides with respect to a longitudinal axis of symmetry of the heating apparatus 1 which is made in the shape of a band.

The portions 8 and 9 can have any perimeter wanted to make contact with the respective terminals 16 as effective as possible.

As can be seen in FIG. 2, the two terminals 16 are distant from each other and the danger of contact is avoided which would cause a short circuit and thus damage the first layers 4.

Also note that in the eventuality the band 2 is perforated by a sharp object while it is being laid, the two first layers 4 are kept at a sufficient distance from each other by the centre layer 3 which has an electrically insulating effect; for this reason, even if the burrs of the edges of a hole at the entry of the sharp object in a lap of the first layers 4 are folded towards the other lap, the centre layer 3 prevents these burrs from coining into contact with the other lap, avoiding a short circuit.

In addition, also the width of the first layers 4 is kept narrower than the overall width of the band 2 for the same reason, to avoid contacts between the sides of the laps that form the second layers 4, leaving the bilateral areas 12 free from electricity conducting materials.

It is to be noted that as a result the band 2 is very light and extremely flexible which makes handling and laying far quicker and easier.

The invention claimed is:

1. Heating apparatus comprising a stratified and flattened body, said body comprising, symmetrically from the center outwards:
    two first layers of laminar electricity conducting elements adhesively coupled together by interposing one center layer of first laminar insulating material;
    two second layers of second laminar insulating material covering said two first layers; and
    at least one third layer of laminar insulating material covering said second layers,
    wherein said second layers comprise sheets of removable adhesive material that can be removed by manually pulling them from said first layers, said sheets of removable adhesive material being polyethylene,
    wherein said center layer comprises:
        a laminar supporting core in insulating material, wherein the insulating material is a sheet of polyester;
        two first elements for coating said laminar core, said two first elements being two respective sheets of non-woven fabric; and
        two second elements for insulating covering said first elements so to insulate said center layer from said first layers.

2. Apparatus according to claim 1, wherein said second layers can be removed from, and can be put back on said first layers.

3. Apparatus according to claim 1, wherein said first layers have corresponding dimensions slightly narrower than the corresponding dimensions of said center layer and third layers in such a way as to define contact and coupling areas between these which are external to said first layers.

4. Apparatus according to claim 3, wherein said corresponding dimensions comprise width dimensions.

5. Apparatus according to claim 3, wherein said third layers comprise two respective sheets of polymer material.

6. Apparatus according to claim 5, wherein said polymer material comprises polyester.

7. Apparatus according to claim 6, wherein each of said two respective sheets has a thickness included in the range between 30 and 40 micron.

8. Apparatus according to claim 1, wherein said first layers have first mutually joined ends and opposite second ends separate from one another, suitable for an assembly of a connection device to electricity sources.

9. Apparatus according to claim 1, wherein said stratified and flattened body comprises a band body.

10. Apparatus according to claim 9, wherein said band body comprises a flexible band body.

11. Apparatus according to claim 9, wherein said second ends are arranged asymmetrically with respect to a longitudinal axis of said band body.

12. Apparatus according to claim 8, wherein said connection device comprises at least two respective terminals applicable on each of said second ends.

13. Apparatus according to claim 8, wherein said first ends are defined by folding said first layers.

14. Apparatus according to claim 1, wherein to said second layers are applied overlapping third layers of protective material.

15. Apparatus according to claim 1, wherein said sheet in the laminar supporting core has a thickness included in the range between 25 and 35 micron.

16. Apparatus according to claim 1, wherein each sheet of said two respective sheets of non-woven fabric has a thickness included in the range between 35 and 115 micron.

17. Apparatus according to claim 1, wherein said two second elements of insulating covering comprise respective sheets of polymer material.

18. Apparatus according to claim 17, wherein said polymer material comprises polyester.

19. Apparatus according to claim 17, wherein each of said two respective sheets of polymer material has a thickness included in the range between 20 and 25 micron.

20. Apparatus according to claim 1, wherein said first layers comprise foils of metal material.

21. Apparatus according to claim 20, wherein said metal material comprises aluminium.

22. Apparatus according to claim 20, wherein said foils of metal material have a thickness included in the range between 8 and 16 micron.

23. Apparatus according to claim 1, wherein said sheets of removable adhesive material have a thickness included in the range between 45 and 65 micron.

24. Heating system comprising the heating apparatus according to claim 1.

* * * * *